Patented Aug. 10, 1954

2,686,133

UNITED STATES PATENT OFFICE 2,686,133

COATING SOLUTION CONTAINING A CELLULOSE COMPOUND AND AN ALKYL TITANATE

Harry H. Beacham, Plainfield, N. J., assignor to National Lead Company, New York, N. Y., a corporation of New Jersey No Drawing. Application September 13, 1950, Serial No. 184,719

11 Claims. (Cl. 106—189)

This invention relates to film-forming and drying compositions of matter. More specifically it relates to compositions which are capable of forming durable films.

Many types of film-forming and drying compositions have been commercially produced and marketed for many years. Among these are paints, shellac, varnishes, lacquers and enamels. Although these films have been used for many years on floors, woodwork, furniture and on many other articles as protective coatings, few of them are quick air-drying and yet highly resistant to water, alkalies and organic solvents.

An object of this invention therefore is to provide a film-forming and drying composition which is capable of forming a quick air-drying hard protective coating. A further object is to provide a composition which is capable of forming a film which will withstand contact with organic solvents, alkalies and water. These and other objects will become apparent from the following more complete description of the present invention.

In its broadest aspect this invention contemplates a film-forming and drying composition of matter comprising an alkyl titanate and a cellulosic derivative having from 0.2 to 0.8 free hydroxyl groups per glucose unit, dissolved in an organic solvent, said solvent containing an alcohol.

The alkyl titanates used in this composition are the ortho esters of titanic acid which preferably include esters prepared from alcohols containing from 1 to 12 carbon atoms in the alcohol group. Alkyl titanate which has been condensed through a partial hydrolysis reaction, i. e. hydrolysis up to 3 of the 4 alkoxy groups during the condensation reaction, may also be employed instead of the alkyl titanates themselves. These hydrolysis condensation products of the alkyl titanates are capable of being used in film forming and drying compositions which are equal to those produced by utilizing the non-hydrolyzed form of alkyl titanate. The term "alkyl titanate" when used in this specification includes the non-hydrolyzed and partially hydrolyzed forms.

The cellulosic derivatives which may be employed in the present invention have from 0.2 to 0.8 free hydroxyl groups per glucose unit. Among the preferred cellulosic derivatives however are nitrocellulose, cellulose acetate, cellulose propionate, cellulose butyrate, cellulose acetostearate, cellulose acetomalate, cellulose nitroacetate, ethyl cellulose, butyl cellulose and benzyl cellulose.

The solvent employed to make a solution of the cellulosic and titanate constituents may be described, in nomenclature employed in this art, as a two-type solvent containing a monohydric alcohol. The solvent must, in the first instance, be capable of dissolving the cellulosic derivative, and suitable solvents for dissolving the various types of cellulosic compounds are well known. These will include, depending on the cellulosic derivative employed, ethers, ketones, esters, aromatic hydrocarbons and chlorinated hydrocarbons. The alkyl titanate compound may be solubilized in almost any solvent capable of dissolving the cellulosic derivative. In addition to capability of dissolving the cellulosic derivative, the solvent must also contain a monohydric alcohol. The two-type solvent, therefore, can be either a mixture of two or more of the above-mentioned compounds providing that one is a monohydric alcohol or may be a single compound that contains the characteristic alcohol group as well as possessing the necessary solvent properties. By volatile is meant that the solvent shall volatilize at normal room temperatures. Aliphatic solvents boiling at temperatures up to 155° C., such as ethyl lactate, and aromatic solvents such as benzene and its homologs boiling up to 144° C. (the boiling point of o-xylene), are considered to be among the solvents contemplated as "volatile" for the purposes of this invention.

The film-forming composition is readily prepared. The cellulosic derivative and the alkyl titanate are dissolved in the organic solvent with agitation usually at substantially room temperature. In order to obtain rapid solubilization it is preferred to first add the cellulosic derivatives to the organic solvent. When dissolved the alkyl titanate is then added to the mixture.

With this composition of matter, films or protective coatings may be formed by applying the composition to a surface and allowing the coating to air dry. When dried the protective coating has a hard surface which is insoluble in and resistant to organic solvents and alkalies.

Apparently the solvent must contain an alcohol. The function of the alcohol in the solvent apparently prevents or delays the alkyl titanate and the cellulosic derivative from reacting. When the composition is dried however the solvent containing the alcohol is evaporated and the reaction proceeds to form a titanium cellulosic polymer possessing a hard surface which is insoluble in and resistant to organic solvents and alkalies.

The amount of alkyl titanate to cellulosic derivatives may vary widely in the film-forming compositions. It has been found that for every part of alkyl titanate used in the mixture from 0.1 to 9.0 parts, preferably from 0.2 to 2.0 parts, of cellulosic derivative may be employed.

These film-forming compositions may be opacified if desired by employing almost any type of opacifying agent, such as for example titanium dioxide, zinc oxide, lithopone and white lead.

The hardnesses of the air dried films were tested by a standard weighted dual knife-edged rocker device called the "Sward Rocker Hardness Meter" described in detail in the National Paint, Varnish and Lacquer Manufacturing Association, Scientific Section Circular No. 510, August 1936.

In order to more fully explain the present type of film-forming compositions and to show the type of films produced by such compositions the following examples are presented:

*Example I*

A film-forming composition was prepared which had the following composition:

9 parts of ethyl cellulose
59 parts of xylene
25 parts of ethyl lactate
7 parts of butyl titanate The ethyl cellulose used had a viscosity of 10 centipoises and contained 2.6 ethoxyl groups per anhydroglucose unit.

The ethyl cellulose was added to the xylene and ethyl lactate at room temperature with agitation. After eight hours the ethyl cellulose was dissolved and a clear solution was formed. The butyl titanate was then added to the mixture with stirring and was dissolved in 30 minutes.

A portion of this film-forming composition was then sprayed onto a wooden panel to form a film of approximately 1 mil thickness and the film was allowed to air dry at room temperature for 24 hours. The dried film was insoluble in organic solvents, water and alkalies, and possessed a Sward hardness of 37. The film was impervious and transparent and possessed a uniform texture with a high gloss.

*Example II*

The following film-forming composition was prepared according to the procedure described in Example I.

16 parts of 28% solution of 6 seconds nitrocellulose in butyl acetate containing 4.5 parts of nitrocellulose and 11.5 parts of butyl acetate
37 parts of ethyl acetate
40 parts of butanol
7 parts of butyl titanate A portion of this film composition was sprayed onto a glass panel and air dried for 24 hours. Again the dried film was insoluble in organic solvents, water and alkalies. The film was impervious and transparent and possessed a uniform texture with a high gloss. The Sward hardness was 63.

*Example III*

A film-forming composition was prepared in the same manner and had the following composition:

9 parts ethyl cellulose—50 centipoises and 2.5 ethoxyl groups per anhydroglucose unit
55 parts benzene
23 parts ethylene glycol monoethylether
13 parts isopropyl titanate A portion of the composition was brushed at about 4 mil thickness onto a steel panel and air dried for 24 hours. The film was substantially identical to that produced in Example I except it had a Sward hardness of 47.

*Example IV*

The following composition was prepared according to the previously described procedure:

9 parts cellulose acetate—10 seconds 2.5 acetate groups per anhydroglucose unit
82 parts ethyl lactate
9 parts butyl titanate In this example ethyl lactate served as the solvent in a dual capacity; that of dissolving the cellulose acetate, and also as the alcohol itself.

A portion of the composition was drawn down on a steel panel with a doctor blade to obtain a wet film having a thickness of 3 mils. The air dried film was substantially equal to that produced in Example I except that it had a Sward hardness of 50.

*Example V*

The following film-forming composition was prepared:

7 parts ethyl cellulose—50 centipoises 2.5 ethoxy groups per anhydroglucose unit
56 parts tetrachloroethane
19 parts amyl alcohol
18 parts butyl titanate An air dried film prepared from the above composition possessed the same characteristics as those previously described. It had a Sward hardness of 68.

*Example VI*

A film-forming and drying composition was prepared which utilized a hydrolyzed condensation product of butyl titanate. The hydrolyzed condensation product was prepared as follows:

3 liters of 1 molar solution of water in butanol were added in 2 hours to 2 mols (680 grams) butyl titanate dissolved in 680 milliliters of butanol. The mixture was then refluxed for 1 hour and the butanol stripped under vacuum on a steam bath. The condensed titanate was kept under vacuum for 8 hours to remove all of the remaining butanol. The product was finally obtained as a resinous, white, easily powdered solid. It was soluble in diethylether, benzene, carbon tetrachloride and butyl alcohol and insoluble in methyl alcohol and petroleum ether. The analysis of the condensation product is represented by the formula $(BuO)_{1.1}TiO_{1.45}$ which represents a hydrolysis of 2.9 alkoxy groups during the condensation reaction.

The following film-forming composition was prepared utilizing the condensed butyl titanate hydrolyzed product:

5 parts ethyl cellulose—50 centipoises 2.5 ethoxyl groups per anhydroglucose unit
72 parts tetrachloroethane
18 parts butanol
5 parts of partially hydrolyzed butyl titanate The same procedure described in Example I was used to prepare a film. The air dried film possessed the same characteristics as those previously described. It had a Sward hardness of 66.

*Example VII*

A film-forming and drying composition was prepared which utilized a hydrolyzed condensation product of isopropyl titanate. The hydrolyzed condensation product was prepared as follows:

0.3 mol (85.2 grams) isopropyl titanate in 90 milliliters isopropyl alcohol was hydrolyzed by adding 0.45 mol water (7.9 grams) dissolved in 300 milliliters isopropyl alcohol during a 1 hour period. The temperature of the reaction mixture was maintained at 40° C. At the completion of the 1 hour addition a slightly cloudy solution was obtained. This was then refluxed for 1 hour at which time the solution became clear and finally deposited a small amount of solid material. This solid material was filtered from the solution thus leaving a clear solution. The solvent was then stripped on a steam bath and finally completely removed at 8 millimeters of mercury. The product was a resinous white solid which was easily broken into a powder. It was soluble in diethyl ether, benzene, carbon tetrachloride and butyl alcohol and insoluble in methyl alcohol and petroleum ether. The condensed isopropyl titanate analyzed 59.5% $TiO_2$. It therefore is a polymer containing 1 alkoxy group per titanium.

The following film-forming composition was prepared:

9 parts ethyl cellulose—50 centipoises 2.5 ethoxyl groups per anhydroglucose unit
65 parts benzene
17 parts ethylene glycol monoethylether
9 parts condensed isopropyl titanate A film was prepared by brushing the solution on a steel panel 1 mil thickness and was air dried for 24 hours. The air dried film possessed the same characteristics as those previously described. It had a Sward hardness of 56.

From the above description and by the example presented it has clearly been shown that these unique films prepared from the film-forming compositions of the present invention are insoluble in organic solvents, alkalies and water. The films are impervious and form hard clear surfaces by air drying the film-forming composition in a short period of time.

While this invention has been described and illustrated by the examples shown, it is not intended to be strictly limited thereto and other modifications and variations may be employed within the scope of the following claims.

I claim:

1. A film forming and drying composition comprising a solution of a cellulosic derivative selected from the group consisting of cellulose nitrate, lower cellulose aliphatic acylates and cellulose ethers containing from 2 to 7 carbon atoms in the etherifying group, said cellulosic derivative having from 0.2 to 0.8 free hydroxyl groups per glucose unit, and an alkyl titanate containing from 1 to 12 carbon atoms per alkyl group in a solvent medium consisting essentially of a lower aliphatic liquid solvent having a boiling point substantially no higher than 155° C., and containing a compound having an alcohol radical.

2. A composition according to claim 1 in which said cellulosic derivative contains 0.4 to 0.6 free hydroxyl groups per glucose unit.

3. A composition according to claim 1 in which said cellulosic derivative and said alkyl titanate are present in such proportions that for each part of said alkyl titanate present in the composition there are from 0.1 to 9.0 parts of said cellulosic derivative.

4. A composition according to claim 1 in which said cellulosic derivative and said alkyl titanate are present in such proportions that for each part of said alkyl titanate present in the composition there are from 0.2 to 2.0 parts of said cellulosic derivatives.

5. A composition according to claim 1 where said alkyl titanate is a partially hydrolyzed alkyl titanate containing from 1 to 12 carbon atoms per alkyl group.

6. A composition according to claim 1 in which the cellulosic derivative is ethyl cellulose.

7. A composition according to claim 1 in which the cellulosic derivative is cellulose acetate.

8. A composition according to claim 1 in which the cellulosic derivative is nitro-cellulose.

9. A composition according to claim 1 in which the alkyl titanate is butyl titanate.

10. A composition according to claim 1 in which the alkyl titanate is butyl titanate and the cellulosic derivative is ethyl cellulose.

11. A film-forming and drying composition comprising a solution of a cellulosic derivative selected from the group consisting of cellulose nitrate, lower cellulose aliphatic acylates and cellulose ethers containing from 2 to 7 carbon atoms in the etherifying group, said cellulosic derivative having from 0.2 to 0.8 free hydroxyl groups per glucose unit, and an alkyl titanate containing from 1 to 12 carbon atoms per alkyl group in a solvent medium consisting essentially of a lower aliphatic liquid solvent having a boiling point substantially no higher than 155° C. and containing a compound having an alcohol radical, and a member of the group consisting of benzene and homologs of benzene having boiling points substantially not in excess of 144° C.

References Cited in the file of this patent

UNITED STATES PATENTS

| Number | Name | Date |
|---|---|---|
| 1,652,353 | Graul | Dec. 13, 1927 |
| 2,113,449 | Hoffman et al. | Apr. 5, 1938 |
| 2,129,735 | Haslam | Sept. 13, 1938 |

FOREIGN PATENTS

| Number | Country | Date |
|---|---|---|
| 217,455 | Switzerland | Oct. 31, 1941 |
| 21,072 | Australia | of 1945 |

OTHER REFERENCES

Kraitzer et al., "Jour. Oil Colour Chem. Assoc." 31 (1948), pp. 405–414.

Speer et al., Jour. Ind. & Eng. Chem. 42, pages 251, 2–3.